United States Patent [19]

Mustered

[11] 4,117,906
[45] Oct. 3, 1978

[54] LINEAR TRAVEL DEVICE FOR SELF-PROPELLED ARTICULATED VEHICLE

[75] Inventor: Lyle V. Mustered, Streator, Ill.

[73] Assignee: Anthony Company, Streator, Ill.

[21] Appl. No.: 792,269

[22] Filed: Apr. 29, 1977

Related U.S. Application Data

[63] Continuation-in-part of Ser. No. 743,622, Nov. 22, 1976.

[51] Int. Cl.² .............................................. B62D 5/06
[52] U.S. Cl. ..................................... 180/139; 280/404
[58] Field of Search ............... 180/139, 136, 51, 14 R; 280/404, 442, 407, 438 R, 441

[56] References Cited

U.S. PATENT DOCUMENTS

| | | | |
|---|---|---|---|
| 3,479,055 | 11/1969 | Cunha et al. ........................ | 280/407 |
| 3,606,384 | 9/1971 | Fontaine et al. ..................... | 280/407 |

FOREIGN PATENT DOCUMENTS 940,054  1/1974  Canada ...................................... 180/136
194,726  8/1923  United Kingdom ..................... 280/404

Primary Examiner—John A. Pekar
Attorney, Agent, or Firm—Alter and Weiss

[57] ABSTRACT

A self-propelled articulated vehicle having two vehicle modules pivotally attached at their ends. Steering of the vehicle is obtained through hydraulic steering components attached between the first and second vehicle modules and pivotally attached at a common end. A single load container is carried across the two vehicle modules at pivotal support mountings, with one of the support mountings cooperating with a linear track device to displace the load container a desired direction and distance when the articulated vehicle is steered. Utilization of independent power drive for each of the two vehicle modules increases the maneuverability of the overall articulated vehicle and minimizes the miring down of the vehicle in slick, muddy, or staggered terrain. Through elimination of conventional steering techniques, increased power and lower fuel consumption is obtained through such an articulated steering technique.

4 Claims, 12 Drawing Figures

LINEAR TRAVEL DEVICE FOR SELF-PROPELLED ARTICULATED VEHICLE

CROSS-REFERENCE TO RELATED APPLICATION

This is a Continuation-In-Part Application of my co-pending application having Ser. No. 743,622, filed Nov. 22, 1976.

BACKGROUND OF THE INVENTION

The present invention in general relates to transport vehicles and trucks and, in particular, to a linear travel device for a self-propelled articulated vehicle having two separate vehicle modules for carrying a load thereon.

The vast majority of conventional transporting vehicles in utilization today comprise tractor-trailer combinations in which an independent driving tractor module is engaged with a separate container-trailer which is pivotally attached thereto, usually by a fifth wheel connection supported on the rear of the tractor unit. With such an arrangement, the driving or powered wheels are limited to the interchangeable tractor unit, leaving the container or trailer portion with no independent power drive means of its own. Often, the greatest amount of weight distribution is concentrated onto the wheels supporting the container, and not the tractor, which creates maneuverability problems when the tractor's drive wheels are mired down in slick, muddy and/or rough terrain. Additionally, maneuverability problems become increasingly important in this "load pulling" arrangement, especially when the wheels of either separate component, the tractor, or the trailer, gets stuck in such mud, or becomes ineffective due to entrapment in loose earth, sand, bog, snow, or piles of litter, often encountered in refuse dumps and the like. Similarly, such a "load pull" arrangement for the vehicle and the load hampers the ability to "walk out" of tire track ruts and soft terrain due to the locating of the power drive means on only the forward tractor power drive wheels.

Also associated with the more conventional tractor-trailer arrangement for transporting containerized loads, are the problems of poor maneuverability in turns arising out of the often enormous length of the container height and trailer itself which, through its length, remains unarticulated and rigid. Most typical of these problems are the substantially large turning radii of such vehicles, as well as the inescapable problem involved with turning relatively sharp corners wherein the tractor unit must be drawn out as far as possible into the turn so as to keep the container-trailer unit from slicing across the corner as the turn is executed. The wear-and-tear on concrete curbing, as well as the tires on the container-trailer portion of the vehicle, all too often attest to the punishment handed out by such a vehicle. So, too, do the many accidents which occur when a driver in the tractor unit must draw the vehicle out as close to the oncoming traffic as possible, so as to negotiate many ordinary, not to mention, sharp turns.

The overwhelming vast majority of such tractor-trailer vehicles for hauling containerized goods, such as semi-trailer trucks having containerized dump or refuse hauling means associated therewith, encounter several other problems due to their type of construction. Almost all of these vehicles rely upon steering through the use of conventional Ackerman steering mechanisms in which the two or more front wheels of the front cab portion can be swiveled into place to enter a change of course for the vehicle. The vast amount of mechanical cooperating elements, pumps, reservoirs, and mechanisms involved with conventional steering techniques on such containerized transport vehicles increase the power consumption and through such a conventional steer front axle with its associated turning wheels. Unless increased power loss is developed through the addition of a power steering unit, drivers operating such conventional type transport vehicles often find the steering and overall handling of such a massive vehicle overwhelming.

Similarly, the lack of power drive means and overall steering control on the rear portion of the conventional vehicle, that is the container-trailer portion, increases the potential for out-of-control situations in which, for example, the overall vehicle is more prone to jackknifing.

Another drawback arising out of the use of conventional type tractor-trailer or semi-trailer type vehicles, arises under the concern paid today to Federal and State regulations on maximum loads and weight distribution requirements directed towards the truck industry. As is well known, weight distribution and load limits are often calculated on the basis of weight per axle and/or weight per power driven axle. The limitations imposed by conventional tractor-trailer vehicles as well as the inability to selectively distribute the weight of a containerized load amount often reduces the legal load carrying limit and requires the utilization of more transportation vehicles and greater power and fuel consumption in order to effectuate delivery of desired loads.

Inherent with the problems listed above, several articulated vehicles have been devised which, to a degree, offset the limitations discussed. As an alternative to the conventional tractor-trailer or semi-trailer truck configuration utilized in commerce today, vehicles such as those disclosed in Kamner, U.S. Pat. No. 3,515,235 have been devised. While steering on this particular reference is dependent upon conventional Ackerman steering means, to a degree, reduction in turning radius and improvement in maneuverability can nonetheless be obtained. Similarly, articulated vehicles, as those disclosed in Robinson et al., U.S. Pat. No. 2,933,143; Starkey U.S. Pat. No. 2,271,808; Lindell, U.S. Pat. No. 3,771,241, and McGee, U.S. Pat. No. 2,834,480 have been develped to offset the conventional difficulties outlined above. But it should be realized that few, if any, of these references offer the structural characteristics of an articulated vehicle formed by two separate vehicle modules, each having its own power drive means. Similarly, few, if any, of these references disclose the particular utilization of a single container means distributed over and supported by both of the vehicle modules to afford selective weight distribution and the ability to obtain particular load displacement characteristics of the container when such a vehicle negotiates turns.

It is thus an object of the present invention to provide a self-propelled articulated vehicle comprising two separate articulated vehicle modules which can walk out of tire track ruts, crawl, or inch through adverse soft terrain, and avoid miring down in mud, loose earth, sand, snow, refuse dumps, etc. through the use of independent module drives which can be synchronized. Similarly, it is an object of the present invention to be more maneuverable and have a sharper turning radius with easier steering than conventional truck transport apparatus.

It is also an object of the present invention to provide a viable alternative to conventional Ackerman steering systems by utilizing a simpler steering mechanism to provide more efficient steering without the need for mechanical constructions inherent with the Ackerman system. At the same time, such a construction reduces the power loss, friction, and cumbersome characteristics of conventional steering.

It is additionally an object of the present invention to enable greater payloads to be carried than conventional vehicles through enabling maximum legal loading on all axles of the vehicle by selection. At the same time, it is an object to attain these results on a vehicle transporting container means in which the payload of the vehicle is loaded.

Further, it is an object of the present invention to provide an articulated vehicle comprising two vehicle modules which impart a desired displacement of a container supported by both modules so as to enable interchangeability of specific containers, describing specific displacements, without the need for adjusting the basic two-module articulated vehicle. At the same time, it is an object to provide a self-propelled articulated vehicle having all of these improved features as an alternative to conventional transporting apparatus, which has the additional feature of minimizing the likelihood of lack of control of the vehicle by the driver, thus reducing the possibility of jackknifing. These and other objects of the invention will become apparent through the present disclosure.

SUMMARY OF THE INVENTION

The present invention is a self-propelled articulated vehicle comprising a first vehicle module having a driver control portion and a second vehicle module pivotally attached at its one end to the proximate end of the first vehicle module. Hydraulic articulated steering means are operably connected between these first and second vehicle modules so that the entire container is supported partially by the first module and partially by the second module. The container means are pivotally attached to the first module at a point along the longitudinal axis of the first module and, similarly, the container means are pivotally attached to the second vehicle module at a point along the longitudinal axis of the second vehicle module. While the container is pivotally attached to both the first and second vehicle modules, one of these two container support pivot means has travel means associated therewith. It is through these travel means that the container itself is disposed when the first vehicle module pivots relative to the second vehicle module through the vehicle pivot means. Thus, linear travel means allow for a repositioning of one of the two container pivoting support points to enable steering or articulation of the vehicle which could not be accomplished otherwise.

In the preferred embodiment of the invention, the self-propelled articulated vehicle further includes each of the two vehicle modules as having power drive means. Each of the drive means may be operated independently of the operation of the other, or the drive means of each may be synchronized to operate cooperatively with one another. Further, in the preferred embodiment, each of the two vehicle modules has at least two vehicle axles apiece, with at least two wheels emerging from each of the axles, although four wheels per axle would normally be used.

The container means utilized with the articulated transport vehicle of the present invention includes at least four types, although others may be incorporated. The first type of container means comprises a load-ejection type refuse truck container which is carried, as previously described, by the first and second vehicle modules at the first and second container support pivot means. This particular type of container means is maintained in a substantially horizontal position at all times on the vehicle and thus may include a permanently affixed container and/or container frame apparatus which is stationarily placed and supported at the first and second container support pivot points.

Another type of container means encompassed by the present invention is that of a roll-off type refuse truck container which, similarly, is carried by the first and second vehicle modules at the first and second container support pivot means. This type of container means includes frame means which are pivotally attached at the first and second container pivot means on the first and second vehicle modules respectively, and hoist means at one end of the container means connecting the frame means to the refuse container underside. Such a refuse container includes means for sliding rearwardly off from the underframe when the underframe is raised at one end of the container means by such hoist means, with the sliding means in the preferred embodiment comprising a plurality of roller means juxtaposed between the top of the refuse frame and the refuse container underframe.

A third type of container means envisioned by the present invention is that of a dump-truck container means, having frame means pivotally attached at the first and second container pivot means on the first and second vehicle modules respectively, as well as hoist means at a first end of the container means interposed between the frame means to the dump-truck container. As opposed to the previously mentioned roll-off refuse container, the dump-truck container is pivotally attached at one end to the frame means positioned atop the two vehicle modules. In the preferred embodiment, this dump-truck container is pivotally attached to the frame means at a second end opposite the first end of the container means at which point the hoist means are positioned, although the end of the hoist means may be attached at virtually any position along the underside of the container means, to effectively reduce the travel or stroke of the hoist, or, alternatively, to minimize the amount of force required by the hoist against the container to incline the dump container body.

Additionally, the container means comprise a cement mixer container which utilizes frame means pivotally attached at the first and second container pivot means on the first and second vehicle modules respectively, with the cement container attached to the frame means in a manner which allow rotation of the cement container about a desired axis. Container means further comprises flat bed or platform containers which may or may not have substantial side frame structures.

While virtually any number of pivotal connection means may be utilized for attachment of the container means to the first and second vehicle modules at the points of pivoting, the preferred embodiment of the invention includes pivotal attachment of the container through one or more "fifth wheels" attached to one or both of the first and second vehicle modules.

The linear travel device through which the container may be disposed sideways or longitudinally to allow articulated steering of the vehicle, in one embodiment comprises a substantially straight slotted orifice, in either the first or second vehicle module, which receives the first or second container pivot means respectively for sliding movement therein. However, in order to effectuate a more sideways displacement of the container during the steering operation, linear travel means at one of the said two container pivot points would comprise a substantially arcuate slotted orifice in either the first or second vehicle module, receiving the respective pivot means, for sliding movement therein. In another embodiment of the invention, the invention includes removal of the linear travel means from either of the two vehicle modules and, instead, provides for linear travel means within the container means itself, into which a fixed pivot means on one of the two vehicle modules can be positioned. Thus, for example, a straight slotted orifice would be fabricated into the bottom of the appropriate container means, depending upon the container means itself, so that a particular type, size or weight container means may be affixed to the two container support pivot points and yet travel through a particular displacement that is preferred for that particular container. Different containers, requiring different paths of travel during the steering of the vehicle may then be utilized without altering the basic two-module arrangement and permanent locations of container pivot points on each of the modules may be used. While pin-in-slot linear travel means are shown, other means may be utilized to accommodate rotary and linear travel when pivot steering occurs.

In the preferred embodiment, the linear travel device comprises a platform capable of reciprocating relative to one or more of the articulated module frames. Thus, instead of relying upon a pin-in-slot configuration, the reciprocating platform is affixed about the module frame upon which it slides through the utilization of rollers and rails or through the use of slides and rails. In either the roller or slide device, rotary motion is obtained in addition to the linear motion, through the placement upon the platform of 5th wheel or rotary bearing attachment means.

The preferred embodiment of the invention again includes hydraulic articulated steering means comprising two or more telescoping hydraulic cylinders located between the two modules proximate to the vehicle pivot means also located therebetween. Each of the two or more hydraulic cylinders is pivotally attached at one side with one side of each affixed to the first module and the other side of each affixed to the second vehicle module. The cylinders are actuated to alternatively extend and contract by the steering control means located in the driver control portion in one of the two vehicle modules. To steer left, for example, a cylinder located on the left side of the pivot point would be retracted, while the cylinder on the right side of the pivot point would be extended, and vice versa, to steer right.

As discussed earlier, one of the advantages to the present articulated vehicle invention is the weight distribution, as desired, of an entire carried load over two separate modules and a plurality of power drive means. This will enable the user of the invention to appropriately distribute the load for better traction, for example, while at the same time enabling larger loads to be carried over a plurality of driven axles, in accordance with the state highway laws which set maximum weight distributions allowed for various container-carried loads. Through the use of airlift type axles through which the container and the load carried therein can be substantially redistributed, the user of such an invention obtains even more control over the distribution of the load within the container and the spreading of such distribution over the various driven and/or nondriven axles.

DETAILED DESCRIPTION OF THE DRAWINGS

Figure 1:
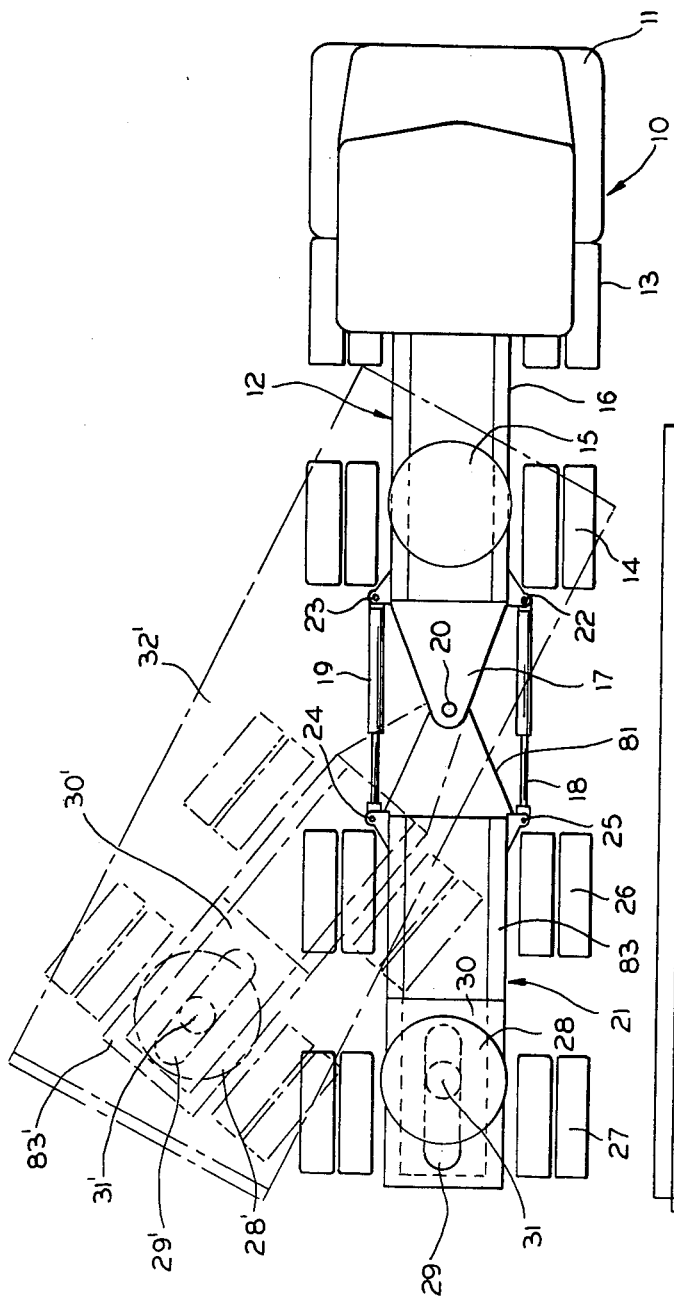
FIG. 1 of the drawings is an overhead plan view of the self-propelled articulated vehicle showing, particularly, the two vehicle modules and the arrangement and displacement of a container during the execution of a turn.

While this invention is susceptible of embodiment in many different forms, there is shown in the drawings and will herein be described in detail, several specific embodiments, with the understanding that the present disclosure is to be considered as an exemplification of the principles of the invention, and is not intended to limit the invention to the embodiments illustrated.

Self-propelled articulated vehicle 10, as shown in FIG. 1 having driver control portion 11 located on first vehicle module 12. In this particular embodiment, first vehicle module 12 has vehicle axles 13 and 14, one or both of which may be directly driven by vehicle power drive means. Fifth wheel 15, is utilized on first vehicle module 12 and is supported by module frame 16 so as to comprise the first support pivot means upon which the container means is pivotally supported. Extension member 17, projecting from and comprising a part of first vehicle module 12, pivotally connects at vehicle pivot means 20 with second module extension member 81. Hydraulic steering means 18 and 19 are interposed between the two vehicle modules 12 and 21 so as to effectuate steering therebetween. In the preferred embodiment, these hydraulic steering means comprise two hydraulic telescopic cylinders, one of which is positioned on one side of vehicle pivot 20, the other being positioned on the other side of vehicle pivot 20. Hydraulic cylinder 19 is pivotally attached to vehicle module 12 at pivot 23 and, in turn, to vehicle module 21 at pivot 24. Similarly, cylinder 18 is pivotally attached to vehicle module 12 at pivot 22 and, in turn, to vehicle module 21 at pivot 25.

The second vehicle module 21 is also shown in FIG. 1 as comprising an independent vehicle module with module frame 83 and vehicle wheel axles 26 and 27, one of which or both of which may be driven by power means connected through conventional transmission techniques. As can be seen, the second fifth wheel 28, comprises second support pivot means onto which the second end of the container means 32 is supported. Besides being pivotable at this second support pivot means, the invention includes linear travel means 29 to provide for the displacement of container 32 when first vehicle module 12 pivots relative to second module 21 at vehicle pivot means 20. In this particular embodiment, the linear travel means 29 comprises a slot cooperating with fifth wheel 28 with travel sliding pin 31 protruding downwardly from fifth wheel 28 to describe the course of travel in slot 29 as the modules 12 and 21 pivot relative to one another. Slot 29 comprising the linear travel means, is fabricated into linear travel member 30 which is further supported by second module frame 83. As can be seen, through the dashed portion of the illustration, when container 32' needs to be displaced because of pivotal movement between the two vehicle modules', sliding pin 31 travels in slot 29' to allow rearward travel of container 32'. As can be seen, similarly, fifth wheel 28 and associated pin 31 are positioned further from the end of frame 83 when the vehicle is substantially in a straight position, while wheel 31' is more closely positioned to the end of frame 83' when the container is displaced. Thus, displacement occurs when the two vehicle modules 12 and 21 are pivoting relative to one another.

Figure 2:
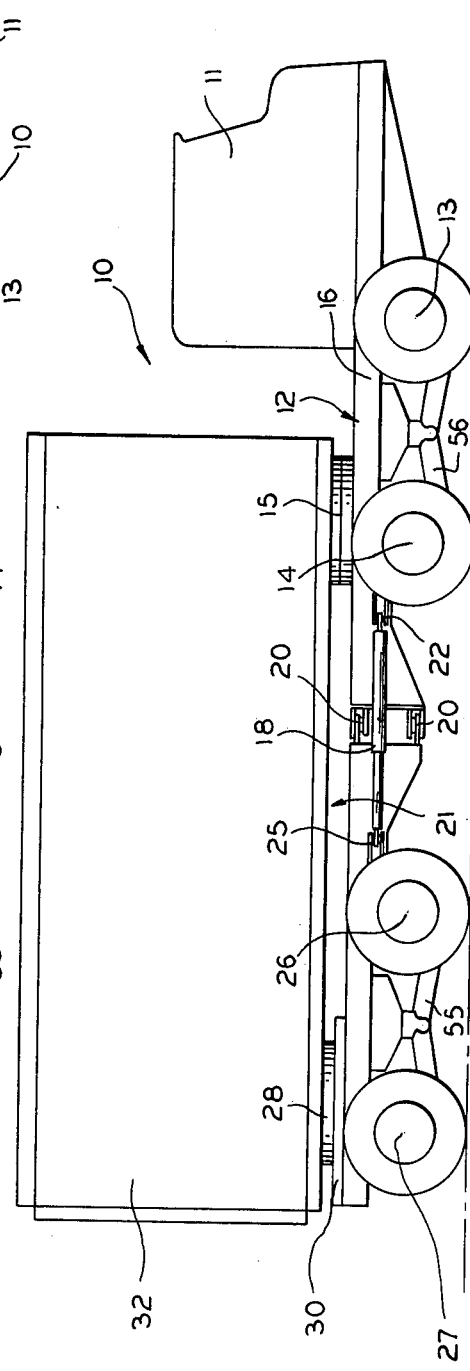
FIG. 2 is a side elevational view of the articulated vehicle illustrated in FIG. 1 showing the construction thereof, with the container means supported thereby.

A side view of the articulated vehicle 10 is shown in FIG. 2 wherein driver control means 11 and first and second vehicle modules 12 and 21 respectively, are clearly shown. Container 32 is supported by first and second pivot support means 15 and 28 respectively, which, in this preferred embodiment of the invention, comprise fifth wheels. Linear travel means 30 is also shown supporting fifth wheel 28 to provide for the displacement of container 32 when the two modules 12 and 21 pivot relative to one another at vehicle pivot means 20. These pivot means 20, to provide reinforced construction, are in fact, two co-linear pivot devices with an upper device located directly over the lower device. Besides increasing the strength of the pivot means, such a double pivot construction is provided as a safety feature in case of failure of any one pivot location. Also shown in FIG. 2 is telescoping hydraulic steering means 18 attached at pivots 25 and 22 to the second vehicle module and first vehicle module respectively.

The preferred embodiment of the invention further includes the invention as described above with each of the vehicle modules having independent power drive means. Thus, vehicle axles 13 and 14 on first module 12 would be driven independently of axles 26 and 27 on second vehicle module 21. For the maximum in improved maneuverability and "walk-out" features for the articulated vehicle 10, all of the vehicle wheel axles would be driven and be capable of independent control for each module, as well as being driven synchronously with one another. However, in a similar manner, two or three of the separate vehicle wheel axles may be driven with some slight losses in the areas of maneuverability. What is important, however, is that at least one of axles 13 and 14, as well as one of axles 26 and 27 are driven so that the invention has at least one driving vehicle wheel axle on each of the vehicle modules. For purposes of increased supporting characteristics, a fifth or sixth axle and wheel assembly may be provided for the invention without changing the basic features of the invention.

FIG. 2 also discloses suspension means 55 and 56 which, in the preferred embodiment, cooperate with airlift-type axles on both the first and second vehicle module axles so as to enable selectivity in weight load distribution.

Figure 3:
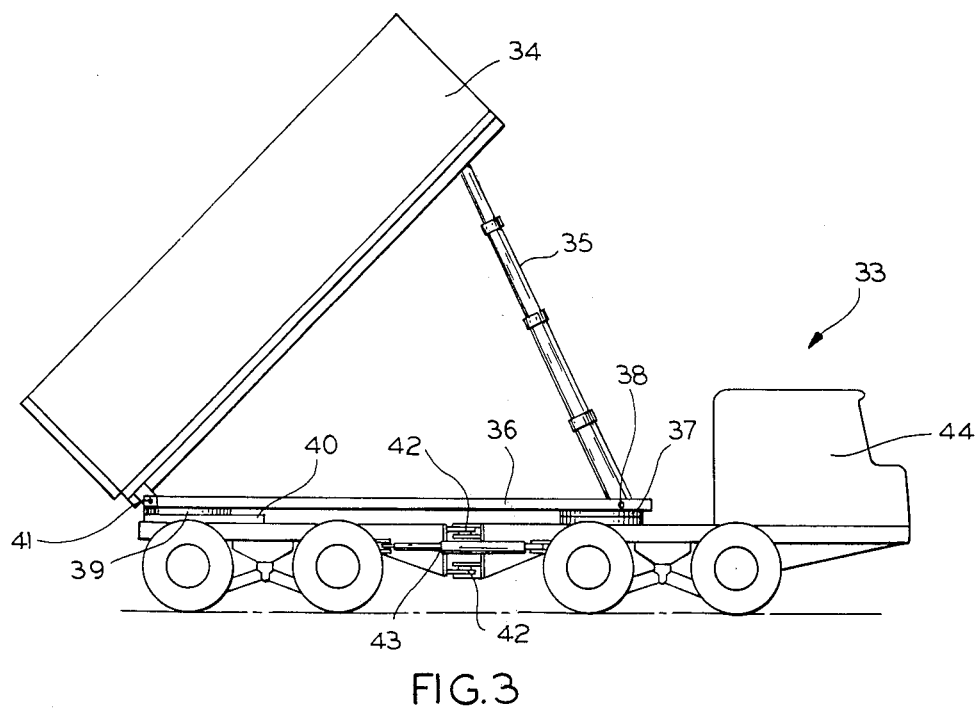
FIG. 3 is a side elevational view of the articulated vehicle in which the container means comprises a hoist-type dump truck container.

The self-propelled articulated vehicle 33, shown in FIG. 3 incorporates a hoist-type dump truck container 34, utilizing hoist 35, pivoting at pivot 38 with container 34 pivotally attached at dump container pivot 41. In this particular embodiment, in order to minimize the size of the hoist member 35, the piston may be of the telescoping type so as to effectively increase the stroke length of the cylinder, or may comprise a simple hydraulic hoist. Dump truck container frame 36 is pivotally attached and supported by first and second pivot support means 37 and 39 respectively. Also shown in FIG. 3 is linear travel means member 40, vehicle pivot means 42 and hydraulic steering cylinder 43.

Figure 4:
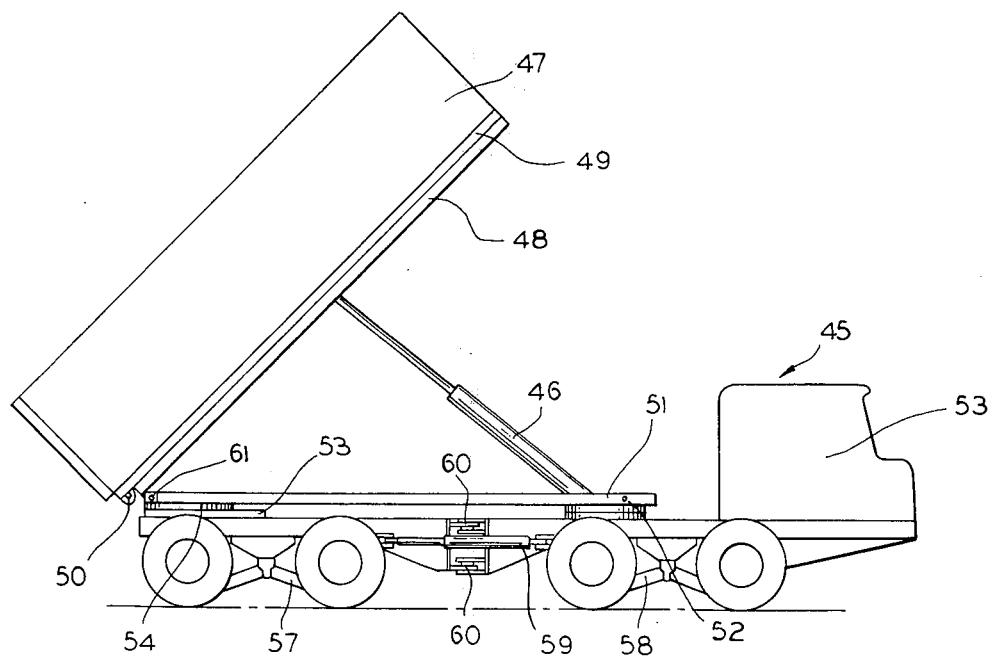
FIG. 4 is a side elevational view of the articulated vehicle of the present invention, in which the container means comprises a roll-off type refuse truck container.

Another embodiment of the self-propelled articulated vehicle 45 is shown in FIG. 4, in which the container means comprises a roll-off type refuse container 47, having a container underframe 48 and container bottom 49. Single telescoping hoist 46 mounted on frame means 51, which is further supported by first and second pivot support means 52 and 54 respectively, serves to elevate container 47, which, through a plurality of rollers or skids, such as roller 50, can slide off from container underfram 48. Also shown In FIG. 4 are driver portion 53, suspension means 57 and 58, steering means 59 and vehicle pivot 60. Pivot 61 is that point at which container underframe 48 pivots relative to frame means 51. In an equivalent manner, the rotatable cement mixer body (not shown) or a load-ejection type refuse body, such as that depicted in FIGS. 1 and 2, may be supported by the first and second vehicle modules.

Figure 5:
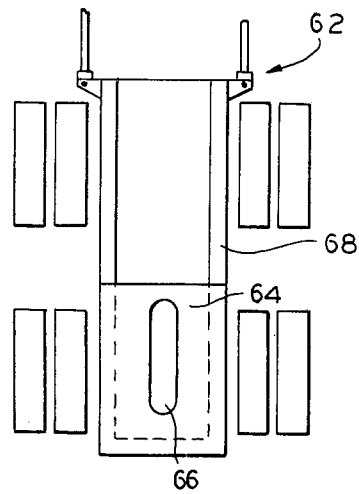
FIG. 5 of the drawings is a top plan view of one of the two vehicle modules in which the linear travel means comprises a straight slotted orifice.
Figure 6:
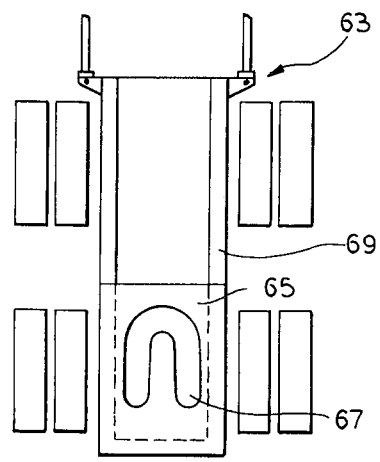
FIG. 6 is a top plan view of one of the two vehicle modules, in which the linear travel means comprises a substantially arcuate slotted orifice.

Vehicle module 62 is shown in FIG. 5 as having module frame 68, linear travel member 64 and straight slotted orifice 66, fabricated therein to enable linear travel, and thus displacement of the container when the articulated vehicle executes a turn. Vehicle module 63 in FIG. 6 similarly shows an equivalent frame 69 and linear travel member 65. However, in this particular embodiment, the linear travel means further comprises an arcuate slotted orifice 67, fabricated into member 65 for an alternative displacement path through which the container would travel when the articulated vehicle is turning.

Figure 7:
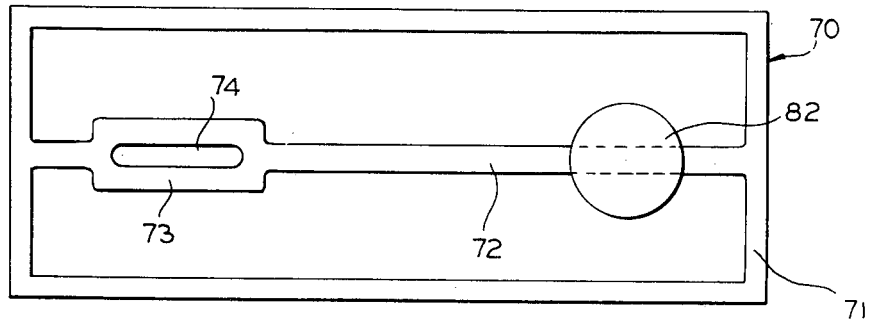
FIG. 7 is a bottom plan view of the underside portion of container means which has constructed therein a substantially straight slotted orifice for the provision of linear travel means.

It may often be more disadvantageous to utilize travel means which are fabricated into the bottom of the container itself rather than relying on travel means incorporated into either the first or second vehicle modules. Thus, a particular type of container being used for a particular purpose would have a predetermined linear travel means which would be most appropriate for the type of load being carried and the weights to be encountered, as well as the size of the container itself. In accordance with this provision, the invention also includes as shown by FIG. 7 the incorporation of linear travel means 74 onto a container bottom such as container 70. In this particular bottom view, container 70 illustrates frame means 71 and 72, as well as forward fifth wheel pivot support means 82. A portion of frame 72 has been enlarged with slotted orifice 74 fabricated therein. By such a construction this particular container can be installed onto a first and second vehicle module assembly which has pivot support means stationary and restrained in one position. Should such a container 70 be removed and replaced with a different size container, or a container utilized for different purposes, weights, etc. then the second container would have a pre-selected travel displacement configuration incorporated on its bottom, and no modification of the first and second modules would need to be made to accommodate the second container.

Figure 8:
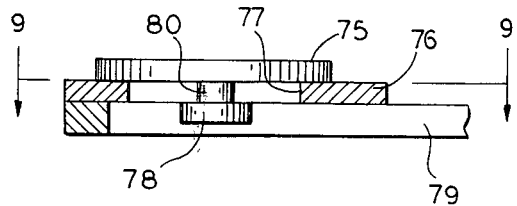
FIG. 8 is a side elevational view showing, in particular, the interplay of the pivoting support means with the linear travel means.
Figure 9:
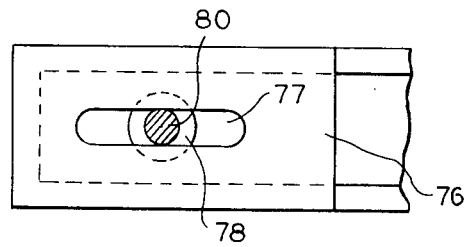
FIG. 9 is a top plan view of the configuration of FIG. 8 in which the pivotable fifth wheel is shown cooperating with the linear means of the present articulated vehicle.

FIGS. 8 and 9 show in side and top view the manner in which pin extension 78 protruding off of fifth wheel 75, fits into slot 77 provided by the linear travel member 76 on top of vehicle module frame 79. In order to prevent inadvertent vertical movement between these members, pin 78 is enlarged so as to be incapable of slipping through slot 77 and is connected by pin neck 80 to fifth wheel 75 to allow horizontal movement therein. Depending upon the types of uses required for a particular vehicle and its module, greater space may be utilized within the slot as between the pin and the slot to allow some desired vertical movement between the slot and linear travel member, and the pin on the fifth wheel. Additionally, a substantially spherically shaped sliding pin member could be used to greatly increase the amount of vertical displacement between the fifth wheel directly attached to the container means and the linear travel means which, in this embodiment, is incorporated into the vehicle module frame itself.

Figure 10:
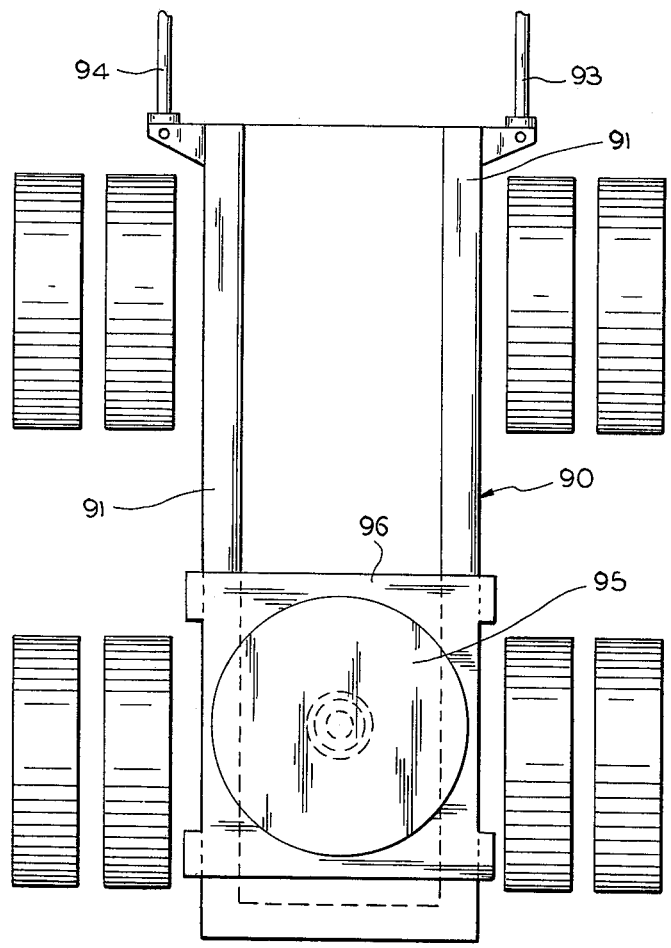
FIG. 10 is a top plan view of the preferred embodiment of linear travel means.
Figure 11:
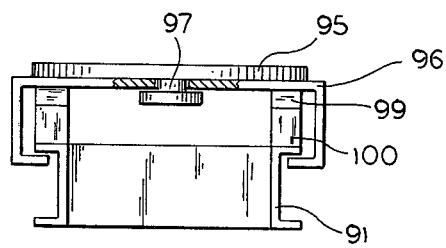
FIG. 11 is a rear elevational view of the linear travel device of FIG. 10.

A preferred embodiment of the linear travel means is shown in FIG. 10 to which module frame 91 has affixed thereto, travel device platform 96 on frame members 91-91. Fixed to the upper portion of platform 96 is rotary pivot support means 95 which could comprise a conventional fifth wheel assembly. FIG. 11 shows the travel means of FIG. 10 as having rotary pivot support means 95, here comprising a conventional fifth wheel assembly rotatably pinned at pin 97 to a reciprocating travel means platform 96. Rail 100 on slide 99 enables the reciprocal movement of platform 96 with respect to module frame member 91 so as to provide linear and rotary motion to that portion of the container means which becomes displaced during articulation of the vehicle as is experienced when turning.

Figure 12:
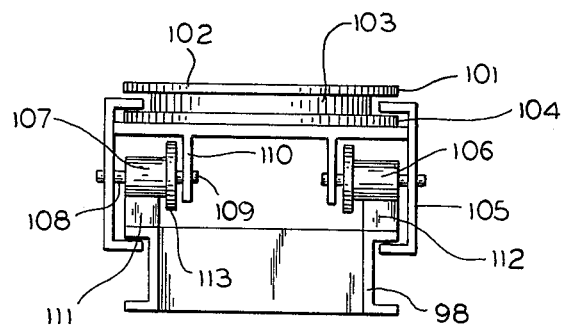
FIG. 12 is a rear elevational view of another linear travel means for enabling articulation of the vehicle.

Another embodiment of the platform-type linear travel means is show in FIG. 12 in which rotary support pivot means 102 is rotatably attached to platform 105 through a flanged neck relationship in which rotary means 102 has flanged portion 103 positioned within platform 105 to be capable of rotating while maintained in place by under-disc 104. Linear motion is imparted to the device through the utilization of interior wheel support 110, coupled to platform 105 through rollers 106 and 107 which are attached thereto by axle 109 and interior support member 110. Rollers 106 and 107 enable linear displacement of platform 105 relative to module frame 98 by gliding on rails 111 and 112 interposed therebetween. Flanges, such as flange 113 on roller 107, are utilized to assure placement of the rollers on their respective rail supports.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A self-propelled articulated vehicle comprising:
   first vehicle module means with a driver control portion located therein;
   second vehicle module means pivotally attached at a first end to the proximate end of said first vehicle module means at a vehicle pivot means;
   hydraulic articulated steering means operably connected between said first and second vehicle modules to actuate pivotal movement between said first and second vehicle modules at said vehicle pivot means;
   container means extending between said first and second vehicle module means so as to be partially supported by each of said two vehicle modules,
   said container means being pivotally attached to said first vehicle module at a first support pivot means between a second end and a first end of said first module,
   said container means being pivotally attached to said second vehicle module at a second support pivot means between said first end and a second end of said module; and
   said container means having travel means proximate one of said two container support pivot means on said first and second vehicle modules through which said container travels when said first vehicle module pivots relative to said second vehicle module at said vehicle pivot means,
   said travel means comprising linear travel platform means affixed to one of said first and second vehicle module means so as to enable reciprocating movement of said platform means relative to said vehicle module,
   said support pivot means affixed to said travel platform means to provide for rotation of said container means;
   said linear travel platform means comprising an inverted substantially U-shaped platform member having inwardly returning flange arm members at its lower end,
   said U-shaped member being separated from said vehicle module by one or more slide and rail means interposed between its upper end and said returning flange arm members at its lower end,
   said U-shaped platform maintained in place about said vehicle module by said inwardly returning flange arm members which encompass a portion of said vehicle module thereby precluding separation of said platform means from about said slide and rail members and in turn said vehicle module;
   said platform means having means for fixed attachment of said support pivot means.

2. The invention according to claim 1 in which said support pivot means are affixed to said linear travel platform means through pin neck means passing through said platform means at a platform aperture said means for affixation further including back plate means attached to said pin neck means and positioned behind the periphery of said platform aperture to preclude inadvertent release of said support pivot means from said linear travel platform means.

3. A self-propelled articulated vehicle comprising:

first vehicle module means with a driver control portion located therein;

second vehicle module means pivotally attached at a first end to the proximate end of said first vehicle module means at a vehicle pivot means;

hydraulic articulated steering means operably connected between said first and second vehicle modules to actuate pivotal movement between said first and second vehicle modules at said vehicle pivot means;

container means extending between said first and second vehicle module means so as to be particlaly supported be each of said two vehicle modules, said container means being pivotally attached to said first vehicle module at a first support pivot means between a second end and a first end of said first module, said container means being pivotally attached to said second vehicle module at a second support pivot means between said first end and a second end of said module; and said container means having travel means proximate one of said two container support pivot means on said first and second vehicle modules through which said container travels when said first vehicle module pivots relative to said second vehicle module at said vehicle pivot means, said travel means comprising linear travel platform means affixed to one of said first and second vehicle module means so as to enable reciprocating movement of said platform means relative to said vehicle module, said support pivot means affixed to said travel platform means to provide for rotation of said container means;

said linear travel platform means comprising an inverted substantially U-shaped platform member having inwardly returning flange arm members at its lower end, said U-shaped member being separated from said vehicle module by one or more roller and rail means interposed between its upper end and said returning flange arm members at its lower end, said U-shaped platform maintained in place about said vehicle module by said inwardly returning flange arm members which encompass a portion of said vehicle module thereby precluding separation of said platform means from about said roller and rail means and in turn said vehicle module, said platform means having means for fixed attachment of said support pivot means.

4. The invention according to claim 3 in which said support pivot means comprise a grooved flange portion in said support pivot means, said U-shaped member being formed by a plurality of platform members restrainably within said grooved flange portion of said pivot means.

* * * * *